United States Patent Office 3,039,968
Patented June 19, 1962

3,039,968
HYDRAULIC FLUID COMPOSITION
John P. Bruce, Lake Jackson, Tex., assignor to The Dow Chemical Company, Midland, Mich., a corporation of Delaware
No Drawing. Filed Apr. 1, 1959, Ser. No. 803,365
6 Claims. (Cl. 252—78)

The present invention relates to lubricants and hydraulic fluid compositions, and is more particularly concerned with a lubricant and hydraulic fluid composition comprising a blend of nuclearly halogenated, alkyl-substituted aromatic compounds and a polyoxyalkylene glycol lower alkyldiether having a molecular weight of about 500 to about 1500. By "lower alkyl" is meant compounds having up to 6 carbon atoms in the alkyl group.

It has been discovered that a mixture of 25 to 80 weight percent of a polyoxyalkylene glycol lower alkyl diether having a molecular weight of about 500 to about 1500 with from 75 to 20 weight percent of a nuclearly halogenated lower alkyl substituted aromatic compound containing from 1 to 3 halogen atoms has excellent shear resistance and desirable viscosity, viscosity index, pour point and density characteristics for use as a hydraulic fluid or lubricant.

Polyoxyalkylene glycol lower alkyl-diether materials which are suitable include, for example, the reaction products of 3-methoxybutanol or 1,3-dimethoxy-2-propanol with methyl chloride and propylene oxide, having a molecular weight of from about 500 to about 1500. The preferable materials are those having molecular weights of about 700 to about 1000.

Nuclearly halogenated lower alkyl substituted monocyclic aromatic compounds which are suitable include, for example, trichlorocumene, tribromocumene, ar-di- and tribromoethylbenzene, ar-di- and trichloroethylbenzene, trichlorohexylbenzene, dichlorocymene, and the like. It is advantageous to provide a minor amount of a stabilizer for said compounds such as, for example, phenothiazine.

The present invention may be further illustrated, but is not to be construed as limited by the following examples.

Example I

Mixtures of the indicated nuclearly halogenated alkyl substituted aromatic compounds and the reaction product of 3-methoxybutanol, methyl chloride and propylene oxide having a molecular weight of 700 to 1000 (PG-204) were prepared by thoroughly mixing for one hour at 60° C. The samples were then tested and results tabulated as follows:

| Aromatic Cpd. | Wt. Percent | Wt. Percent Polyoxyalkylene Glycol Lower Alkyl Diether | A | B | C | Percent Shear [1] | Pour Point, °F. |
|---|---|---|---|---|---|---|---|
| Trichlorocumene | 33⅓ | 66⅔ | 2.76 | 9.44 | 2.75 | 0.004 | −69.8 |
| Do | 50 | 50 | 4.11 | 15.51 | 4.09 | 0.005 | −58.0 |
| Do | 66⅔ | 33⅓ | 5.91 | 24.17 | 5.79 | 0.019 | −52.6 |
| Do | 80 | 20 | 1.87 | 5.61 | 1.87 | 0.000 | −76.0 |
| Do | 10 | 90 | 9.17 | 41.55 | 9.17 | 0.000 | −52.6 |
| Tribromocumene | 50 | 50 | 5.25 | 22.36 | 5.25 | 0.000 | |

A = Kinematic viscosity at 210° F.
B = Kinematic viscosity at 100° F.
C = Kinematic viscosity at 210° F. after shear.
[1] Samples subjected to shear conditions in a sonic oscillator for 45 minutes at 88±2° F. (Raytheon Model DF 1011).

Example II

A comparison of the properties of R-200 gauge fluid (a mixture of ar-di- and tribromoethylbenzene) and PG-204 with a 50-50 mixture (weight basis) of the two indicates the viscosity index improvement which is obtained in the mixture:

| | R-200 | PG-204 | 50/50 Mixture |
|---|---|---|---|
| Kinematic viscosity, 210° F. cps | 0.99 | 12.02 | 5.32 |
| Kinematic viscosity, 100° F. cps | 2.92 | 64.32 | 23.61 |
| Viscosity Index (Hardiman and Nisson) | [1] | 150.00 | 146.3 |
| Density (gm./cc.) | 2.00 | 0.996 | 1.36 |

[1] It is not mathematically possible to calculate the viscosity index of this product.

As the table indicates, the R-200 gauge fluid does not have sufficient viscosity or body to provide lubrication in an automotive torque converter. Use of the polyoxyalkylene glycol lower alkyl diether alone would result in a reduction of torque converter efficiency due to the low density. The mixture has good lubricating and density characteristics, as well as having very good shear stability, and will thereby retain body or viscosity during extended use.

Example III

A comparison of the properties of R-200 gauge fluid (a mixture of ar-di- and tribromoethylbenzene) and the reaction product of 1,3-dimethoxy-2-propanol, methyl chloride and propylene oxide (PG-146) with mixtures of the two (weight basis) indicates the improved properties obtained in the mixtures:

| | R-200 | PG-146 | 25/75 [1] | 50/50 [1] | 75/25 [1] |
|---|---|---|---|---|---|
| Kinematic Visc. at 210° F | 0.99 | 10.41 | 3.15 | 4.99 | 7.09 |
| Kinematic Visc. at 100° F | 2.92 | 51.38 | 12.30 | 21.75 | 32.95 |
| Visc. Index (ASTM) | | 154 | 136.5 | 166 | 160 |
| Flash Point, °F | None | 505 | None | None | None |
| Pour Point, °F | | | −49 | −52 | −52 |
| Density | 2.00 | 0.996 | 1.18 | 1.36 | 1.56 |

[1] R-200/PG-146.
[2] See Example II.

As shown in the table, the mixtures have good viscosity characteristics as well as good densities, flash points and pour points, thereby insuring good lubrication without reduction of torque converter efficiency.

Various modifications may be made in the present invention without departing from the spirit or scope thereof, and it is understood that I limit myself only as defined in the appended claims.

I claim:
1. A composition consisting essentially of (1) from about 25 to about 80 weight percent of polyoxypropylene glycol lower alkyl diether wherein the alkyl group contains from 1 to 6 carbon atoms and having a molecular weight of from about 500 to about 1500 and (2) from about 75 to about 20 weight percent of a nuclearly halogenated alkyl substituted aromatic compound containing 2 to 3 halogen atoms wherein the halogen is a member of the group consisting of bromine and chlorine and wherein the alkyl groups contain from 1 to 6 carbon atoms.

2. The composition of claim 1 wherein the polyoxypropylene glycol lower alkyl diether is the 1,3-dimethoxy-2-propyl methyl diether of a polyoxypropylene glycol having a molecular weight of from about 500 to about 1500.

3. The composition of claim 1 wherein the polyoxypropylene glycol lower alkyl diether is the 3-methoxybutyl methyl diether of a polyoxypropylene glycol having a molecular weight of from about 500 to about 1500.

4. The composition of claim 3 wherein the nuclearly halogenated alkyl substituted aromatic compound is a mixture of ar-di- and tribromoethylbenzenes.

5. The composition of claim 3 wherein the nuclearly halogenated alkyl substituted aromatic compound is tribromocumene.

6. The composition of claim 3 wherein the nuclearly halogenated alkyl substituted aromatic compound is trichlorocumene.

References Cited in the file of this patent

UNITED STATES PATENTS

| 2,502,392 | Sconce et al. | Mar. 28, 1950 |
| 2,654,789 | Ligett | Oct. 6, 1953 |
| 2,782,240 | Hefner et al. | Feb. 19, 1957 |
| 2,786,080 | Patton | Mar. 19, 1957 |

FOREIGN PATENTS

| 200,455 | Switzerland | Dec. 16, 1938 |